(12) United States Patent
Gindele et al.

(10) Patent No.: US 6,813,046 B1
(45) Date of Patent: Nov. 2, 2004

(54) METHOD AND APPARATUS FOR EXPOSURE CONTROL FOR A SPARSELY SAMPLED EXTENDED DYNAMIC RANGE IMAGE SENSING DEVICE

(75) Inventors: Edward B. Gindele, Rochester, NY (US); Andrew C. Gallagher, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 907 days.

(21) Appl. No.: 09/707,673

(22) Filed: Nov. 7, 2000

(51) Int. Cl.[7] .................................................. H04N 1/46
(52) U.S. Cl. ..................... 358/505; 358/475; 348/222.1; 348/229.1; 250/208.1
(58) Field of Search ................................. 358/505, 506, 358/522, 520, 475, 909.1; 348/222.1, 229.1, 369, 364, 362, 294, 296, 297, 298; 250/208.1

(56) References Cited

U.S. PATENT DOCUMENTS

| | | |
|---|---|---|
| 3,971,065 A | 7/1976 | Bayer |
| 4,667,092 A | 5/1987 | Ishihara |
| 5,189,511 A | 2/1993 | Parulski et al. |
| 5,221,848 A * | 6/1993 | Milch ..................... 250/559.02 |
| 5,247,366 A * | 9/1993 | Ginosar et al. ............. 348/256 |
| 5,300,381 A | 4/1994 | Buhr et al. |
| 5,652,621 A | 7/1997 | Adams, Jr. et al. |
| 6,040,858 A * | 3/2000 | Ikeda ........................ 348/242 |
| 6,480,226 B1 * | 11/2002 | Takahashi et al. .......... 348/296 |
| 6,646,246 B1 * | 11/2003 | Gindele et al. .......... 250/208.1 |
| 6,734,913 B1 * | 5/2004 | Motta ........................ 348/362 |

OTHER PUBLICATIONS

U.S. Ser. No. 09/615,398 filed Jul. 13, 2000 by Gallagher et al.

* cited by examiner

Primary Examiner—Jerome Grant, II
Assistant Examiner—Negussie Worku
(74) Attorney, Agent, or Firm—Thomas H. Close

(57) ABSTRACT

A method of exposure control in a camera employing a sparsely sampled extended dynamic range image sensing device includes the steps of: providing a sparsely sampled extended dynamic range image sensing device having fast photosites with a predetermined response to light exposure interspersed with slow photosites with a slower response to the same light exposure; using the image sensor to produce a sparsely sampled high resolution digital image having fast pixel values produced by the fast photosites and slow pixel values produced by the slow photosites; calculating an exposure control value using only the slow pixel values from the a sparsely sampled extended dynamic range image; and using the exposure control value to modify the exposure to the image sensing device.

20 Claims, 11 Drawing Sheets

Fig. 7B

|   | 0 | 1 | 2 | 3 |
|---|---|---|---|---|
| 0 | g* | r | g* | r* |
| 1 | b* | g | b | g |
| 2 | g* | r* | g* | r |
| 3 | b | g | b* | g |

Fig. 7A

|   | 0 | 1 | 2 | 3 |
|---|---|---|---|---|
| 0 | * |   | * |   |
| 1 |   | * |   | * |
| 2 | * |   | * |   |
| 3 |   | * |   | * |

Fig. 10A

| i\j | 0 | 1 | 2 | 3 |
|---|---|---|---|---|
| 0 | g* | g* | g* | g* |
| 1 | g* | g* | g* | g* |
| 2 | g* | g* | g* | g* |
| 3 | g* | g* | g* | g* |

Fig. 10B

| i\j | 0 | 1 | 2 | 3 |
|---|---|---|---|---|
| 0 |  | r* |  | r* |
| 1 | r* |  | r* |  |
| 2 |  | r* |  | r* |
| 3 | r* |  | r* |  |

Fig. 10C

| i\j | 0 | 1 | 2 | 3 |
|---|---|---|---|---|
| 0 | b* |  | b* |  |
| 1 |  | b* |  | b* |
| 2 | b* |  | b* |  |
| 3 |  | b* |  | b* |

METHOD AND APPARATUS FOR EXPOSURE CONTROL FOR A SPARSELY SAMPLED EXTENDED DYNAMIC RANGE IMAGE SENSING DEVICE

FIELD OF THE INVENTION

The invention relates generally to the field of image capture, and more specifically to a method of exposure control in a camera having an extended dynamic range image sensing device.

BACKGROUND OF THE INVENTION

Image sensing devices such as a charge-coupled device (CCD), are commonly found in such products as digital cameras, scanners, and video cameras. These image sensing devices have a limited dynamic range when compared to traditional photographic film products. A typical electronic image sensing device has a dynamic range of about 7 stops. This means that the exposure for a typical scene must be determined with a fair amount of accuracy in order to avoid clipping the resultant signal. By contrast, natural scenes often exhibit a dynamic range of 9 stops and higher. This is mainly a consequence of multiple light sources with widely varying intensities illuminating the scene objects. Specular highlights also contribute to the dynamic range of natural scenes.

Electronic sensors used to scan photographic film must also contend with a high dynamic range of signal intensities. U.S. Pat. No. 5,221,848 issued Jun. 22, 1993 to Milch entitled High Dynamic Range Film Digitizer and Method of Operating the Same discloses a method and apparatus designed to extend the dynamic range of an electronic image sensor. Aimed primarily for scanning photographic film, Milch teaches a method of a one pass film scanner using a charge-coupled device scanner having a plurality of linear arrays having the same spectral sensitivity. One of the arrays has a faster response to light than the other array. The information from the two arrays is then combined and digitized forming an extended dynamic range digital image.

Digital electronic cameras employ a single image sensor with a color filter array (CFA) to produce a sparsely sampled digital image. A typical color filter array pattern is disclosed in U.S. Pat. No. 3,971,065 issued Jul. 20, 1976 to Bayer entitled Color Imaging Array. Interpolation algorithms are employed to produce a full resolution color image from the sparsely sampled image. Digital cameras also need to record scenes having a high dynamic range. One way to obtain a high dynamic range image from a digital camera is to employ a high bit depth analog to digital converter in the camera. Another way is to employ an image sensor having interspersed fast and slow photosites as disclosed in copending U.S. Ser. No. 09/615,398 filed Jul. 13, 2000 by Gallagher et al., which is incorporated herein by reference. Also an important feature of digital cameras is the need to produce digital images with different spatial resolution. This is primarily due to the limited on board memory of the digital camera and due to the limitations in bandwidth for transferring the digital images to other devices sparsely sampled extended dynamic range digital images.

Digital cameras employ electronic image sensors, and have by virtue of the imaging application, a need to record a digital image with high dynamic range. Also an important feature of digital cameras is the need to control the exposure of light received by the electronic image sensor in a manner which makes maximal use of the dynamic range of the electronic image sensor. Conventional techniques for exposure control in digital cameras include using a separate photocell to control exposure, and using the signal from the image sensor in the camera to control exposure. The conventional exposure control techniques do not take into account benefits that may be achieved by the use of an image sensor having fast and slow photosites.

Therefore, there exists a need for electronic image sensors which are capable of recording images with extended dynamic range. Furthermore, there is a need for a method of exposure control which uses the unique attributes of a wide dynamic range electronic image sensor having fast and slow photosites.

SUMMARY OF THE INVENTION

The need is met according to the present invention by providing a method of exposure control in a camera employing a sparsely sampled extended dynamic range image sensing device that includes the steps of: providing a sparsely sampled extended dynamic range image sensing device having fast photosites with a predetermined response to light exposure interspersed with slow photosites with a slower response to the same light exposure; using the image sensor to produce a sparsely sampled high resolution digital image having fast pixel values produced by the fast photosites and slow pixel values produced by the slow photosites; calculating an exposure control value using only the slow pixel values from the a sparsely sampled extended dynamic range image; and using the exposure control value to modify the exposure to the image sensing device.

Advantages

The invention has the advantage that exposure is controlled such that image information loss due to photosite saturation is minimized. The invention has the further advantage that the exposure control value is calculated in a computationally efficient manner by excluding fast pixel values from the computation. The invention has the further advantage that accurate exposure control is provided by using low resolution images derived from the sparsely sampled high resolution digital image.

BRIEF DESCRIPTION OF THE DRAWINGS

FIG. 7A illustrates the arrangement of slow photosites and fast photosites on a panchromatic image sensing device;

FIG. 7B illustrates the arrangement of slow photosites and fast photosites on a color image sensing device;

FIG. 10A illustrates the arrangement of sampled pixels corresponding to green sensitive slow photosites;

FIG. 10B illustrates the arrangement of sampled pixels corresponding to red sensitive slow photosites;

FIG. 10C illustrates the arrangement of sampled pixels corresponding to blue sensitive slow photosites.

DETAILED DESCRIPTION OF THE INVENTION

A digital image is comprised of a one or more digital image channels. Each digital image channel is comprised of a two-dimensional array of pixels. Each pixel value relates to the amount of light received by an imaging capture device corresponding to the geometrical domain of the pixel. For color imaging applications a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image for any of the above mentioned applications.

Although the present invention describes a digital image channel as a two dimensional array of pixel values arranged by rows and columns, those skilled in the art will recognize that the present invention can be applied to mosaic (non rectilinear) arrays with equal effect.

Imaging devices employing electronic sensors are well known, therefore the present description will be directed in particular to elements forming part of, or cooperating more directly with, apparatus in accordance with the present invention. Elements not specifically shown or described herein may be selected from those known in the art. Note that as used herein, the term image is a two dimensional array of values. An image may be a two dimensional subset of another image.

Figure 1:
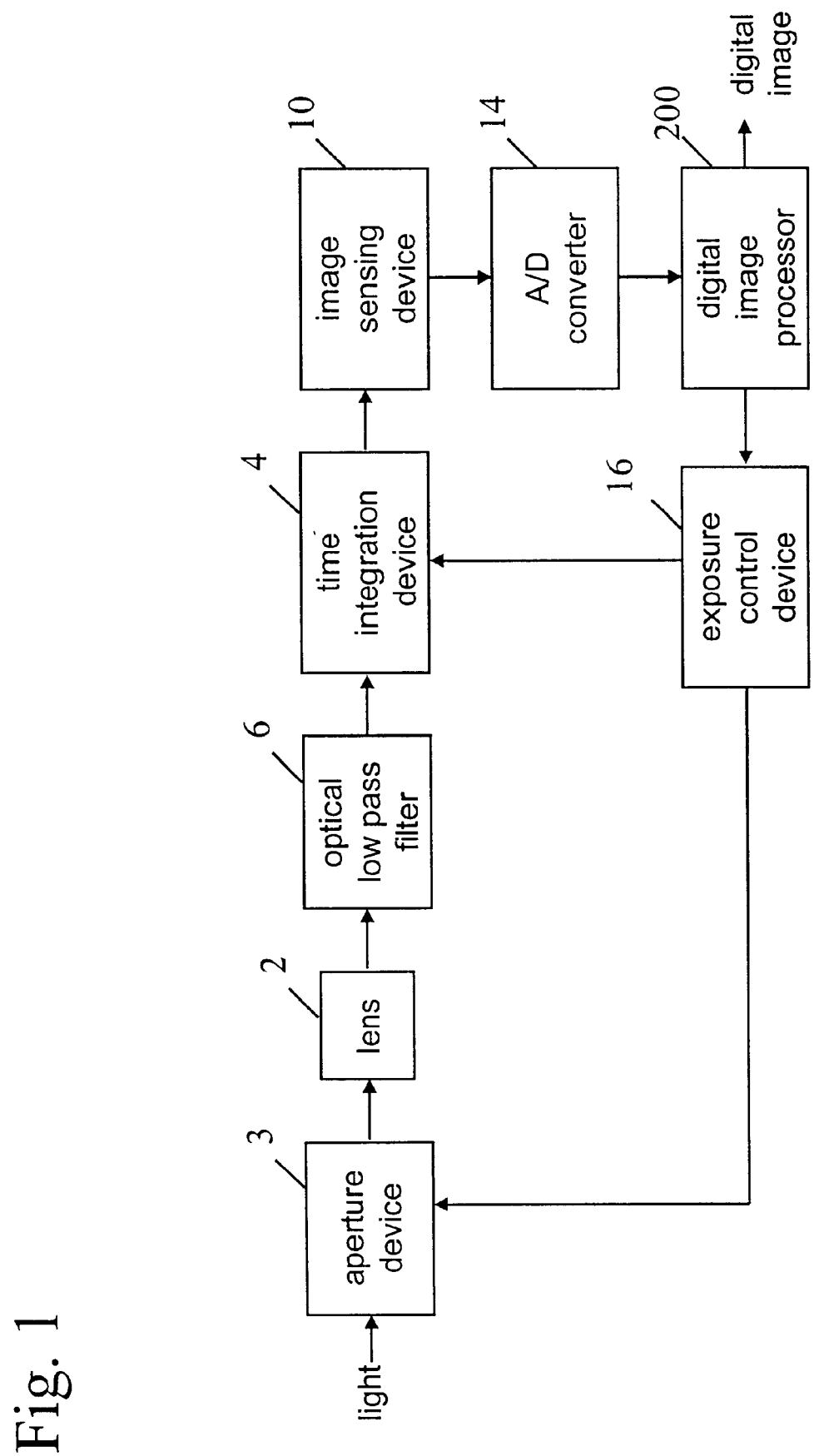
FIG. 1 is a block diagram of a digital camera system utilizing an extended-range image sensing device and a digital image processor according to the invention.

Referring to FIG. 1, light from an object or scene is incident upon a lens 2, forming a photographic image on the image sensing device 10 such as a charged-coupled device (CCD) with a color filter array (CFA). Note that other devices, such as CMOS devices, may be used as the image sensing device 10. An optical lowpass filter 6, placed between the lens 2 and the image sensing device 10 which performs a slight blurring of the imaged light in order to reduce the occurrence of aliasing. The digital camera captures a first image. An A/D converter 14 receives the voltage signal corresponding to the imaged light from the image sensing device 10 and produces an image signal corresponding to the voltage signal. The digital image processor 200 receives the image signal from the A/D converter 14 and calculates an exposure control value derived from the pixel values of the image signal. The exposure control value is received by the exposure control device 16 which alters the setting of either the aperture device 3 and/or the time integration device 4.

With the exposure control setting based on the previously captured image signal, the digital camera captures a second image. In similar manner, the A/D converter 14 receives the voltage signal corresponding to the imaged light from the image sensing device 10 and produces a second image signal corresponding to the voltage signal. The digital image processor 200 receives the second image signal and calculates an extended dynamic range digital image which can be stored in a memory (not shown) in the camera. The extended dynamic range digital image can be processed to produce an enhanced digital image which can be viewed directly on a display device.

The amount of light received by the image sensing device 10 is regulated by the aperture device 3 and the time integration device 4. The aperture device 3 regulates the amount of light by varying the effective diameter of the lighting passing portion of the lens 2. The time integration device 4 regulates the amount of light received by varying the length of time the focused light is allowed to contribute to the response of the image sensing device 10. For some digital cameras, the time integration device 4 may be a shutter which opens during the imaging operation and remains closed otherwise. For other digital cameras, the time integration device 4 may be an integral part of the image sensing device 10. For these digital cameras the length of photo response integration time is controlled electronically. The exposure control device 16 regulates both the aperture device 3 and the time integration device 4.

The exposure control device 16 receives an exposure control value from the digital image processor 200. The digital camera system must be calibrated in order for the exposure control device 16 to properly interpret the exposure control value. The exposure control device 16 has knowledge of the speed value Sv of the image sensing device 10. The exposure control device 16 regulates the diameter of the aperture device 3 and the length of exposure time of the time integration device 4 in accordance with the following mathematical relationship;

$$Av+Tv=Bv+Sv \tag{1}$$

where the aperture value Av is given by the equation:

$$Av=\log_2(Fn^2) \tag{2}$$

where the Fn term is the photographic F number of the lens-aperture, the time value Tv is given by the equation:

$$Tv=\log_2(\tau) \tag{3}$$

where the $\tau$ term is the regulated length of exposure time in seconds of the time integration device 4, and the term Sv is the speed value given by the equation:

$$Sv=\log_2(\pi s) \tag{4}$$

where s is the ISO photographic speed rating of the image sensing device 10. The brightness value Bv is given by the formula:

$$Bv=C_1 b+C_0 \tag{5}$$

where $C_1$ and $C_0$ are numerical calibration constants and b represent an exposure control value received by a photocell used by the digital camera to establish the camera exposure setting when the camera is first turned on. The present invention is primarily related to the imaging scenario when the digital camera has already been turned on and has reached a state of operation where digital images have already been acquired. For this scenario the brightness value is determined using an exposure control value calculated by the digital image processor 200 described hereinbelow.

The exposure control device 16 may have more than one mode of operating, however, two modes are the most useful.

In the aperture Av mode, the exposure control device 16 allows the operator of the camera to set the aperture value Av while the exposure control device 16 sets the time value Tv by the equation:

$$Tv = Bv + Sv - Av. \quad (6)$$

In the time Tv mode, the exposure control device 16 allows the operator of the camera to set the time value Tv while the exposure control device 16 sets the aperture value Av by the equation:

$$Av = Bv + Sv - Tv. \quad (7)$$

It should be recognized to those skilled in the art that the present invention can be used with more complex relationships for determining the exposure control value.

When the camera is in the Av mode, the F number for the aperture device 3 is calculated using equation (8).

$$Fn = \sqrt{2}^{Av} \quad (8)$$

When the camera is in the Tv mode, the integration time for the time integration device 4 is calculated using equation (9).

$$\tau = 2^{Tv} \quad (9)$$

The A/D converter 14 shown in FIG. 1 converts the voltage signal produced by the image sensing device 10 into a image signal, i.e. a stream of digital pixel values corresponding to the voltage signal produced by the photosites of the image sensing device 10. More specifically, the A/D converter 14 converts the voltage signal, nearly linear with respect to the intensity of the incident light, from the image sensing device 10 to a discrete digital image signal, e.g. a 10 bit signal where the linear encoded values range from 0 to 1023. The A/D converter 14 may also perform processing to convert the linear code value domain image signal to a nonlinear code value domain image signal, such as an 8 bit logarithmic signal as is commonly performed in the art. For example, the following equation can be used to convert a 10 bit linear image signal a(x,y), where (x,y) specifies the row and column index of the signal location with reference to the image sensing device 10, into an 8 bit logarithmic image signal b(x,y):

$$b(x, y) = \begin{cases} 0 & 0 \le a(x, y) \le 31 \\ 73.5975 \ln a(x, y) - 255 & 32 \le a(x, y) \le 1024 \end{cases} \quad (10)$$

Note that each stop of exposure (in the linear response region of the image sensing device) results in a doubling of the linear image signal a(x,y) and results in an increase of the logarithmically encoded image signal b(x,y) by 51. In this case, the value 51 represents the number of code values per stop (cvs) of exposure.

Figure 2:
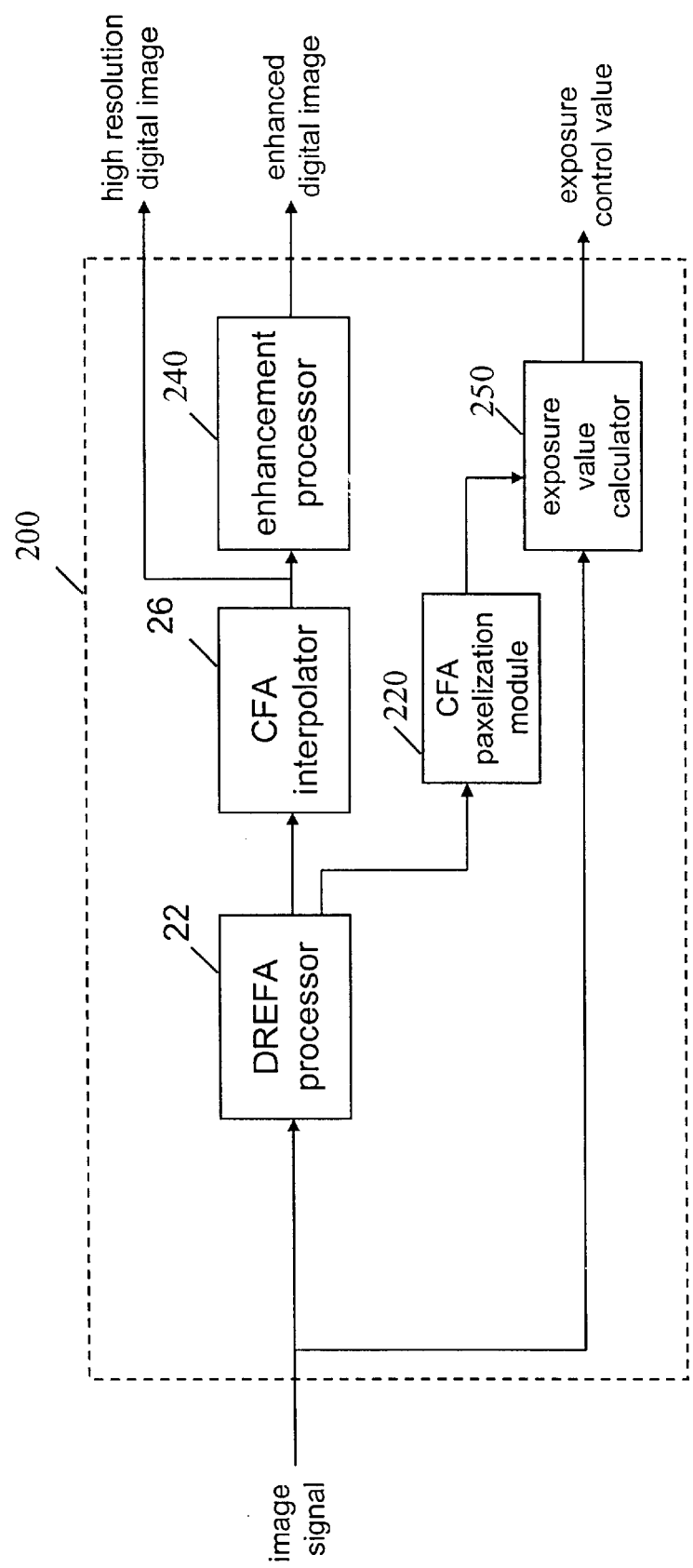
FIG. 2 is a functional block diagram of the digital image processor shown in FIG. 1.

The digital image processor 200 shown in FIG. 1 is illustrated in more detail in FIG. 2. After a first image has been captured by the digital camera, the resulting image signal produced by the A/D converter 14 is received by the exposure value calculator 250. The image signal pixel values are analyzed and an exposure control value is calculated and transmitted to the exposure control device 16. A second image is then captured by the digital camera. The resulting image signal produced by the A/D converter 14 is received by (DREFA) processor 22. The DREFA processor 22 modifies the image signal and transmits the modified image signal to the CFA interpolator 26. The output of the CFA interpolator 26 is a high resolution digital image. The high resolution digital image is received by the enhancement processor 240 which uses the pixels of the high resolution digital image to generate an enhanced digital image.

The purpose of the CFA interpolator 26 is to generate a full description of the color for each location of the sensed photographic image. In the preferred embodiment, the image sensing device 10 consists of an array of photosensitive elements called photosites. Each photosite is typically coated with either a red, green, or blue filter, as described in U.S. Pat. No. 3,971,065 issued Jul. 20, 1976 to Bayer entitled Color Imaging Array which is incorporated herein by reference. The Bayer array is a color filter array in which green filters are located in a checkerboard pattern over the photosites with red and blue filter alternating line by line to fill the interstices of the checkerboard pattern; this produces twice as many green filter sites as either red or blue filter sites. Note that the method described herein may be easily extended to color filter arrays with different arrangements of the primaries, a different number of primaries, or a different set of primaries. Thus, in the preferred embodiment, each photosite is sensitive to either red, green, or blue light. However, it is desirable to obtain a pixel value corresponding to an exposure for each of the red, green, and blue exposures at each photosite location. The pixels values of the image signal constitute a CFA digital image, i.e. a digital image produced by a color filter array of photosites. As such, the photographed image is sparsely sampled in red, green and blue. The CFA digital image is an example of a sparsely sampled digital image.

In this description, "red", "green", and "blue" represent the primary spectral sensitivities of an image sensing device 10, as is well known in the art of image processing. The CFA interpolator 26 generates from the image signal output from the A/D converter 14 an interpolated image signal consisting of a pixel value corresponding to the color primaries for each photosite. For example, if a particular photosite is coated with a red filter, then the A/D converter 14 outputs a red pixel value for that photosite since the red filter essentially blocks green and blue light from that particular photosite. The CFA interpolator 26 calculates a green pixel value and blue pixel value for the corresponding photosite even though the corresponding photosite does not respond to green and blue light. Similarly, the CFA interpolator 26 calculates a green pixel value and a red pixel value corresponding to the blue photosites, as well as a red pixel value and blue pixel value corresponding to the green photosites.

Generally, the CFA interpolator 26 operates by considering the pixel values of the corresponding photosite and the pixel values of associated surrounding photosites. While any commonly known interpolator may be used, a description of a preferred CFA interpolator is contained in U.S. Pat. No. 5,652,621 issued Jul. 29, 1997 to Adams, Jr. et al. entitled Adaptive Color Plane Interpolation in Single Sensor Color Electronic Camera which is incorporated herein by reference. Adams et al. describe an apparatus for processing a digitized image signal obtained from an image sensor having color photosites aligned in rows and columns that generate at least three separate color values but only one color value for each photosite location, and a structure for interpolating color values for each photosite location so that it has three different color values. The apparatus generates an appropriate color value missing from a photosite location by the interpolation of an additional color value for such photosite locations from color values of different colors than the missing color value at nearby photosite locations. The apparatus also obtains Laplacian second-order values, gradient values and color difference bias values in at least two image directions from the pixel values corresponding to nearby photosites of the same column and row and selects a preferred orientation for the interpolation of the missing color value based upon a classifier developed from these values. Finally, the missing color pixel value from nearby multiple color pixel values is selected to agree with the preferred orientation.

The image signal output from the A/D converter 14 is received by the DREFA processor 22 which expands the dynamic range of the image signal. In the preferred embodiment, the dynamic range of the image sensing device 10 is expanded by selecting certain photosites of the image sensing device 10 to have a slow response. The arrangement of the selected photosites with respect to the image sensing device 10 will be discussed in greater detail hereinbelow. In the preferred embodiment, the responses of selected photosites are slowed, or retarded, by altering the gain of the selected photosites, herein referred to as slow photosites. Altering the gain of a photosite is commonly practiced in the art of digital camera design and manufacture.

Figure 3:
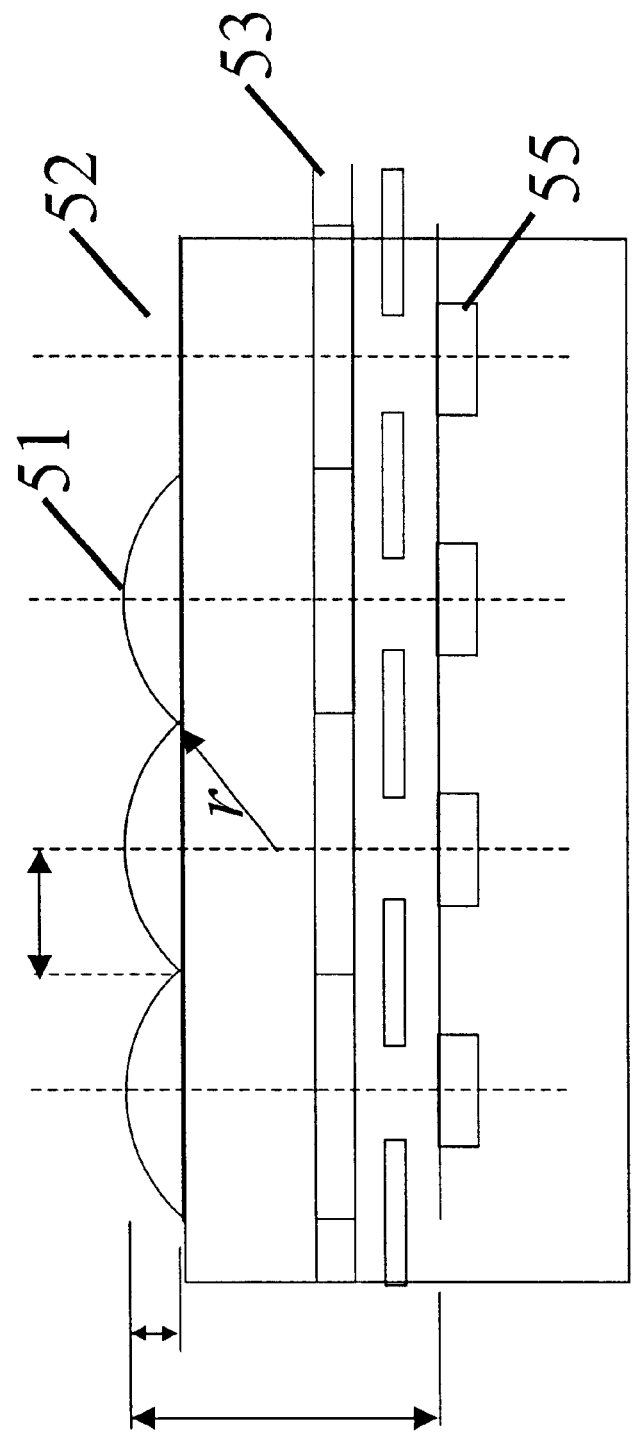
FIG. 3 is a cross-section of an interline image sensor employing an array of lenslets to alter the response of selected photosites.

With reference to FIG. 3, it is a common practice in the art of image sensor manufacture to place resin lenslets 51 on top of each photosite. For example, particularly when the image sensing device 10 is an interline solid state image sensing device, one lenslet technique is described in U.S. Pat. No. 4,667,092 issued May 19, 1987 to Ishihara entitled Solid-State Image Device with Resin Lens and Resin Contact Layer which is incorporated herein by reference. Ishihara discloses a solid-state image device which includes an image storage block having a block surface and a plurality of storage elements are embedded along the block surface to store an image in the form of electric charge. An overlying layer is deposited to form an array of optical lenses in correspondence to the storage elements. An intermediate layer is laid between the block surface and the overlying layer. Incident light focuses through the lenses and the intermediate layer onto the storage elements. The intermediate layer serves as an adjusting layer for adjusting a focal length.

FIG. 3 shows a cross section of an interline solid state image sensing device. Without the lenslets 51, the signal readout area associated with each photosensitive area 55 of a photosite makes it impossible to use the whole area of the semiconductor substrate as the photoelectric transducer area. The conventional solid-state image device does not effectively utilize all incident rays thereon and therefore has low sensitivity. The addition of a resin lenslet 51 on top of a photosite allows the incident rays of light to be focused on the photoactive areas of the photosite, thereby more effectively utilizing the incident rays of light and increasing the sensitivity of the photosite. Thus, by varying the size and/or efficiency of the lenslet 51, the sensitivity (gain) of the photosite may be easily altered. Thus, for interline devices and for CMOS sensors the preferred method of altering the gain of the photosite is by altering the lenslet 51 placed on top of the photosite. As shown in FIG. 3, the location 52 has no lenslet, and therefore fewer incident rays of light are incident with the photosensitive area. Alternatively, a lenslet could be manufactured at location 52 with a different radius, shape, size or material as compared with the lenslet 51, thereby structured to be less efficient at focusing incident rays of light onto the photosensitive area 55 than is the lenslet 51. Those skilled in the art will recognize that if the lenslet 51 focuses 80% of the incident rays of light onto a photosensitive area 55 and the location 52 having no lenslets (or alternatively slow lenslets) allows 20% of the incident rays of light onto a photosensitive area 55, then the photosite covered by lenslet 51 is 2 stops faster than the location 52. In this case, the lenslet 51 is used for fast photosites and no lenslet is used for slow photosites, as represented by location 52.

Figure 4:
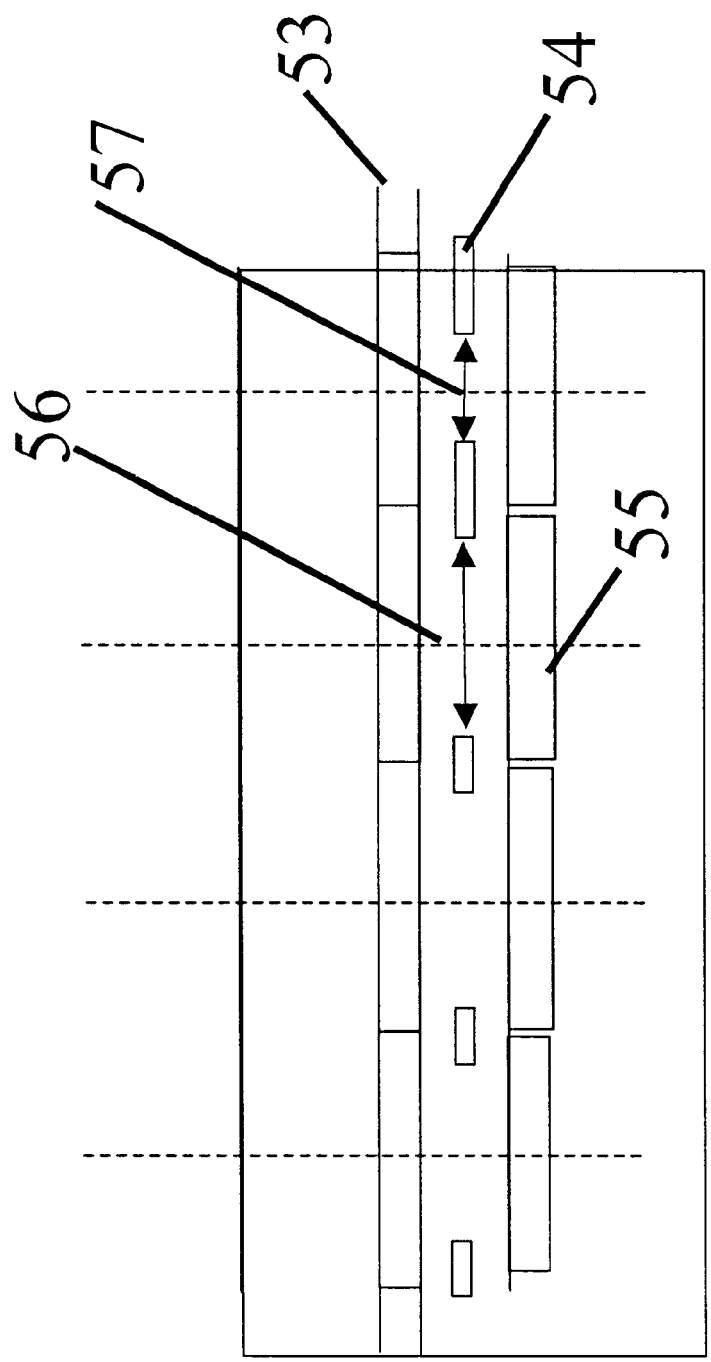
FIG. 4 is a cross-section of a full frame image sensor employing a metal mask to alter the response of selected photosites.

With reference to FIG. 4 showing a cross section of a full frame image sensing device 10, in the case where the image sensing device 10 is a full frame device, light rays incident to the photosensitive area 55 of a photosite must pass through an aperture of a light shield, typically made from metal, which is shown in cross-section in FIG. 4 to comprise light-blocking mask portions 54 and large and small apertures 56 and 57 interspersed among the light blocking portions. In the preferred embodiment, the gain of photosites may be altered by modifying the light blocking mask portion 54. The sensitivity of the photosite is then directly related to the aperture of the light blocking mask portion 54. For example, one photosite with an aperture 50% of the size of a second photosite aperture will have a response of 50% compared to that on the second photosite. For example, a large aperture 56 of a light blocking mask portion 54 allows 80% of the light rays incident upon that photosite to pass through, but a small aperture 57 allows only 20% of the incident light rays to pass. Those skilled in the art will recognize that the photosite with the large aperture 56 is 2 stops faster than a photosite with the small aperture 57. In this case, the large aperture 56 is used for fast photosites, and the small aperture 57 is used for the slow photosites. Thus, the aperture of the light blocking mask may be modified to adjust the response of the selected photosites. The Eastman Kodak Company makes full frame image sensing devices with a metal mask light shield that reduces the pixel active area of all pixels from about 80% to about 20% (for dithered scanner applications where the sensor is moved by ½ the pixel spacing horizontally and vertical and 4 pictures are taken). The invention thus involves utilizing such mask technology, but with different sized apertures, to provide an image sensor with a differential response to image light.

Figure 5:
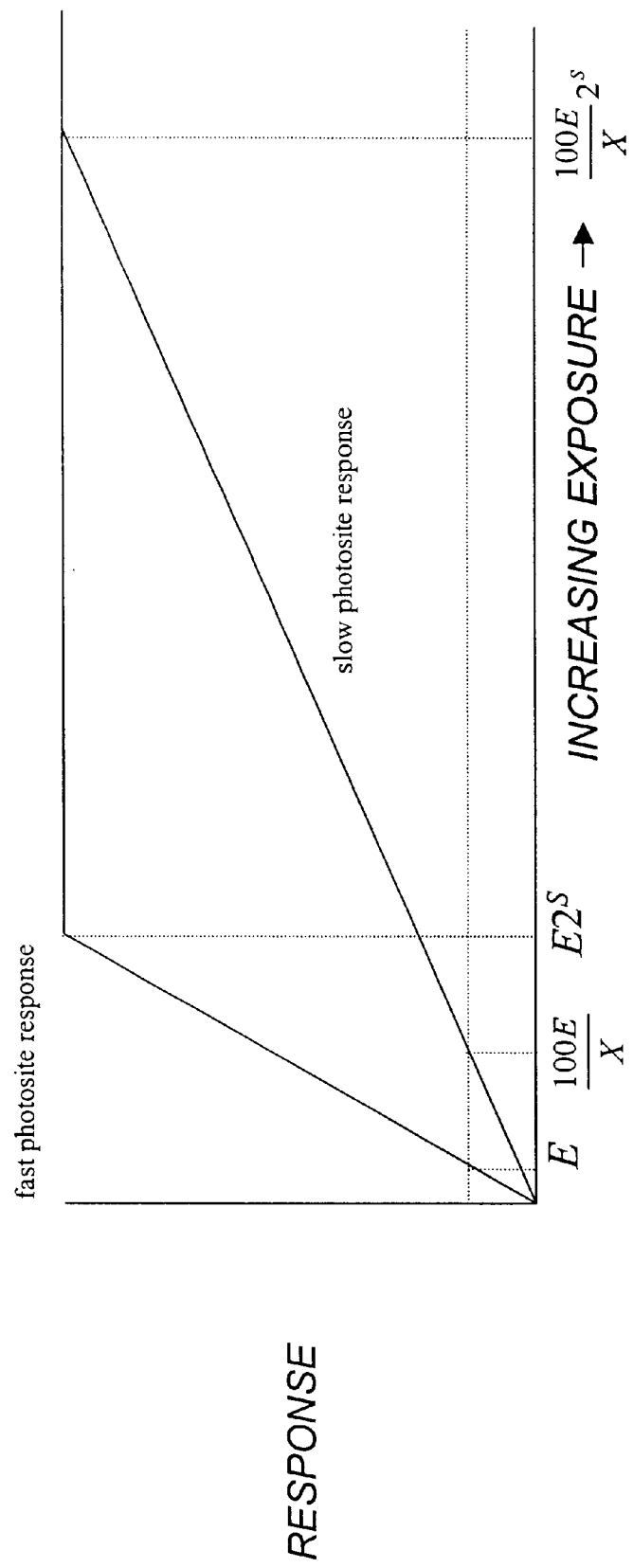
FIG. 5 is a graph illustrating the response of a fast photosite and a slow photosite.

In the preferred embodiment, the response of the selected slow photosites is X % (where X<=100) that of fast photosites for the same exposure, as shown graphically in FIG. 5. In this preferred embodiment, the selected photosites have a response that is slowed by two stops ($-\log X/100$) relative to the fast photosites, resulting in X=25. Thus, the image sensing device 10 consists of multiple sets of photosites, fast photosites and slow photosites. The collection of the output responses of the fast photosites constitutes a sparsely sampled fast digital image, i.e. a sparsely sampled version of a scene sensed with the fast photosites. Likewise, the collection of the output responses of the slow photosites constitutes a sparsely sampled slow digital image, i.e. a sparsely sampled version of a scene sensed with the slow photosites.

Figure 6:
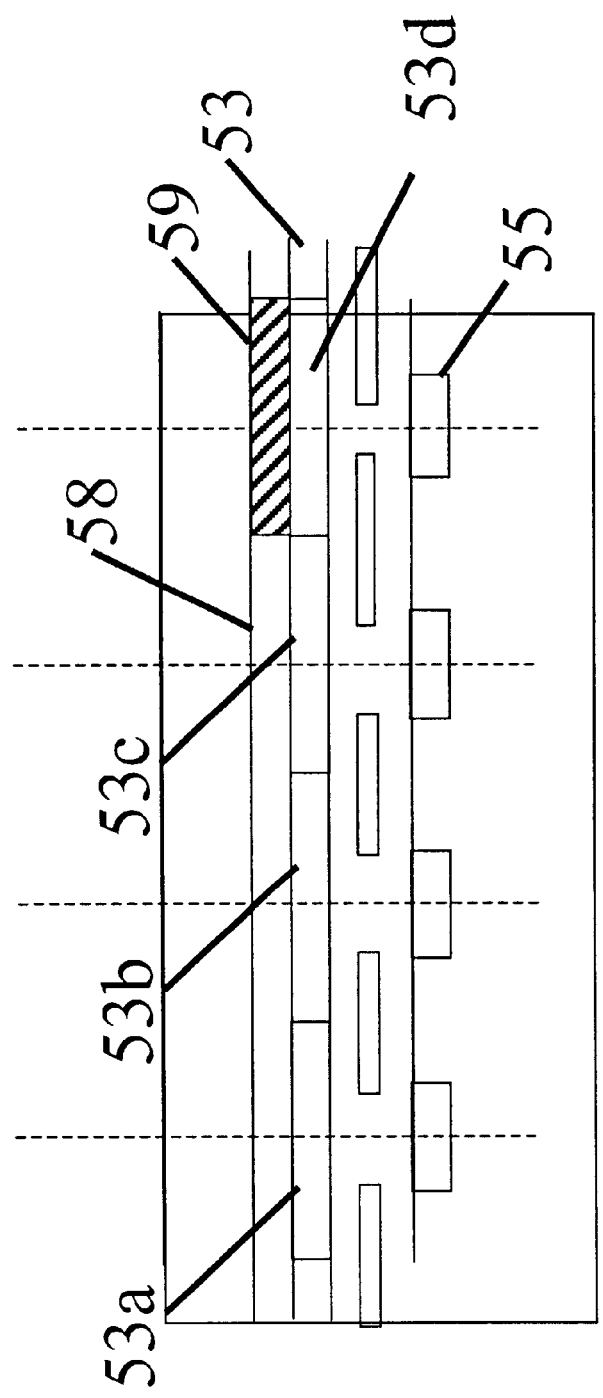
FIG. 6 is a cross-section of an image sensor employing an array of neutral density filters to alter the response of selected photosites.

As another alternative, the responses of the selected slow photosites can be slowed by the use of a neutral filter coating the photosite. FIG. 6 shows a cross section of an image sensing device with a color filter array 53. Note that the color filter array 53a is red, 53b is green, 53c is red, and 53d is green. A layer of neutral filters 58 is contained above the color filter array 53, although the position of the layer of neutral filters 58 and the color filter array 53 does not matter. Note that the layer of neutral filters 58 only contains a neutral filter at the positions of selected photosites, as indicated by the neutral filter 59. In this case, the layer of neutral filters 58 is transparent or nearly transparent for fast photosites and contains a neutral filter 59 for slow photosites. For example, if the neutral filter 59 consists of a material that allows X % transmission of light, then the response of that slow photosite will be slowed by stops relative to the response of the fast photosite.

The DREFA processor 22 shown in FIG. 2 is described in more detail hereinbelow. The purpose of the DREFA processor 22 is to create an image signal with an increased dynamic range by processing the input image signal while accounting for the difference in photo response of the fast and slow photosites. Accordingly, the output of the DREFA processor 22 is an expanded image signal having increased numerical dynamic range. This expanded image signal is then input to the CFA interpolator 26 for processing as previously described.

It is not a requirement of the present invention that the A/D converter 14 and the DREFA processor 22 be directly connected. The DREFA processor 22 may reside in hardware or software in close proximity to the A/D converter 14 and image sensing device 10. For example, the DREFA processor 22 could reside directly within a digital camera. However, the DREFA processor 22 may also be remote from the image sensing device 10. For example, the image signal output from the A/D converter 14 can be transmitted (after compression) via a wire or wireless connection to a personal computing device, printer, or remote server to apply to operation of the DREFA processor 22. Transmission of the image signal may also include file transfer protocol or email. Additionally, payment via credit card or some other means may be required by the DREFA processor 22 from the user.

Figures 7A, 7B:
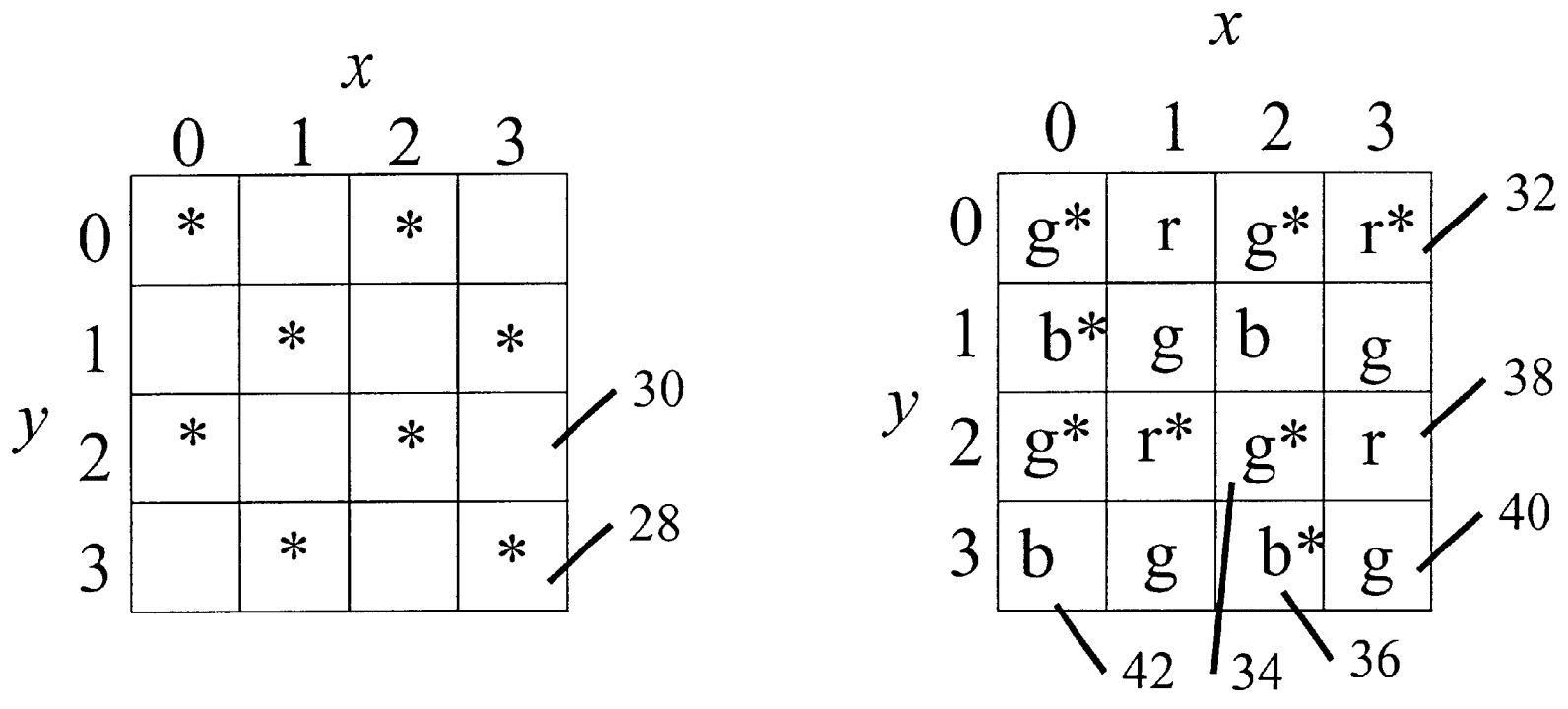

In the preferred embodiment, 50% of the photosites of the image sensing device 10 are selected to have slow response. Those skilled in the art will recognize that varying the percentage of photosites which have slow response will still result in the advantages of the present invention. In the case of an image sensing device 10 in which all photosites have approximately equivalent spectral sensitivity (i.e. a panchromatic image sensing device), FIG. 7A shows an arrangement of the slow photosites that will result in approximately 50% of all the photosites of the image sensing device 10 being of slow response. The photosites 28 with slow response are marked with an asterisk (*), while the photosites 30 having fast response are blank. A sparsely sampled image was previously defined as an image that was captured with an image sensing device having a color filter array. According to the present invention, the term sparsely sampled is also intended to refer to an image produced by an image sensor such as that shown in FIG. 7A where the fast and slow photosites are interspersed.

FIG. 7B shows an arrangement for a color image sensor wherein 50% of each photosite type (red, green, or blue sensitive) has slow response. For example, the photosites 32, 34, and 36 are red, green and blue photosites, respectively, having slow responses, the photosites 38, 40 and 42 are red, green and blue photosites, respectively, having fast response.

Note that FIGS. 7A and 7B imply a regular pattern for the location of the slow photosites. While it is preferable that the slow photosites are arranged in a regular pattern, it is by no means necessary. The slow photosites could be arranged randomly or semi-randomly over the surface of the image sensing device 10, and their location would be stored in some place accessible to the DREFA processor 22.

Referring to FIG. 5, the response of a fast photosite to a certain exposure and the response of a slow photosite to the same exposure are shown. Note that if a level of noise n is superimposed on the response, it can easily be seen that the fast photosite will yield a valid signal with lower exposures (beginning at exposure level E) than will the slow photosite (which yields valid signal beginning at $$\frac{100}{X}E.$$

Alternatively, data from the slow photosite will be valid for higher exposure levels (up to signal level of $$\frac{100}{X}E2^S,$$

where S is the inherent dynamic range of a single photosite, typically S may be about 5 stops) than would the fast photosite (which produces valid response up to an exposure of $E2^S$.) Note that both the fast photosite and the slow photosite have the same range of response in stops of exposure (S), but the response of the slow photosites is preferably $$-\log_2\left(\frac{X}{100}\right)$$

stops slower than the fast photosites, as shown in FIG. 5. It is preferred that the responses of the fast and slow photosites overlap with respect to exposure. That is, it is preferred that $$-\log_2\left(\frac{X}{100}\right) < S.$$

<S. The overall dynamic range of the image sensing device 10, considering both fast and slow photosites, is $$S - \log_2\left(\frac{X}{100}\right).$$

In the case of the preferred embodiment, where S=5 and X=25, the overall effective dynamic range of the image sensing device 10 is 7 stops of exposure.

The DREFA processor 22 may be utilized to extend the overall dynamic range of the digital images produced with the present invention by using the pixel values corresponding to slow photosites to reconstruct the image signals in regions corresponding to very high exposures. Likewise, the DREFA processor 22 also uses the pixel values corresponding to photosites with fast response to reconstruct the image signal corresponding to very low exposures.

Figure 8:
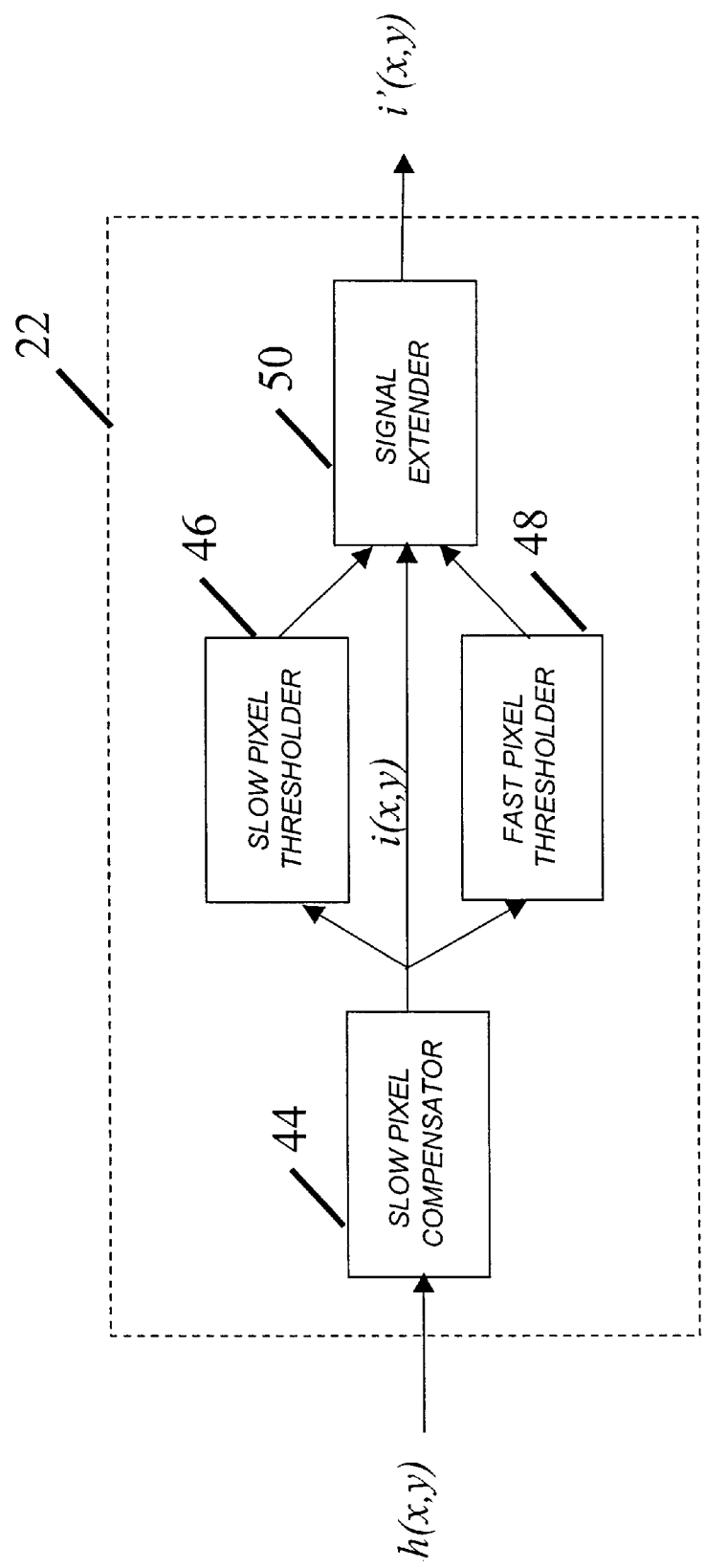
FIG. 8 is a functional block diagram of the dynamic range extending filter array (DREFA) processor.

FIG. 8 shows an exploded block diagram of the DREFA processor 22. The logarithmic image signal b(x,y) output from the A/D converter 14 is passed to the slow pixel equalizer 44. The purpose of the slow pixel equalizer 44 is to compensate the image signal corresponding to slow photosites by accounting for the offset in response by X stops. Alternatively, the fast pixels can be equalized to the slow pixels by adjusting the fast pixels in the opposite direction. In the preferred embodiment, the image signal corresponding to the slow photosites are incremented by the quantity −cvs log (X/100), where cvs is the number of code values per stop of exposure. In the preferred embodiment, the quantity cvs is 51. Alternatively, if the image signal input to the slow pixel equalizer 44 is linearly related to exposure (rather than logarithmically), then the slow pixel equalizer 44 scales the image signal corresponding to the slow photosites by a factor of 100/X. Note that it is assumed that the locations of the slow photosites are known to the slow pixel equalizer 44. The output of the slow pixel equalizer 44 is an image signal i(x,y) that has been compensated at the locations of corresponding to slow photosites for the difference between the slow photosite response in relation to the fast photosite response. At the locations corresponding to fast photosites, the value of the image signal b(x,y) output from the A/D converter 14 is identical to the value of the image signal i(x,y) output from the slow pixel equalizer 44. Note that the image signal i(x,y) is not limited to an 8 bit range. In the preferred embodiment, the value of i(x,y) ranges from 0 to 357 (i.e. 9 bits).

Next, the image signal i(x,y) output from the slow pixel equalizer 44 is input to a slow pixel thresholder 46. The purpose of the slow pixel thresholder 46 is to determine slow pixel values that are of low quality due to a photosite not receiving enough photons to produce a valid signal. The pixel value at these (x,y) locations is then replaced in processing performed by the signal extender 50 by calculating a new pixel value based upon nearby fast pixel values. All slow pixel values which are less than a predetermined threshold are considered to be problem pixel values. In the case of the slow pixel values, this predetermined threshold is referred to as the low exposure response threshold. Thus, a pixel value i(x,y) is considered to be a problem if it is a slow photosite and if:

$$i(x,y) < T_1 \quad (11)$$

where $T_1$ is predetermined. In the preferred embodiment, the value of $T_1$ is given by $$T_1 = -cvs\log_2\left(\frac{X}{100}\right), \quad (12)$$

which in the preferred embodiment is set to a value of 102. Note that the threshold $T_1$ may be dependent upon the color sensitivity of the photosite at location (x,y). Slow pixel values that are problems are referred to as noise pixels, since the value of i(x,y) is not sufficiently above the noise level of the image sensing device to be useful.

Likewise, the image signal i(x,y) output from the slow pixel equalizer 44 is input to a fast pixel thresholder 48. The purpose of the fast pixel thresholder 48 is to determine fast pixels that are of low quality. The pixel values at these locations is then replaced by calculating a new pixel value based upon nearby slow pixel values in processing performed by the signal extender 50, which will be described in detail hereinbelow. All fast pixel values that are greater than a predetermined threshold value are considered to be problem pixels. In the case of the fast pixels, this predetermined threshold used for the purpose of detecting problem fast pixels is referred to as the high exposure response threshold. Thus, a fast pixel value i(x,y) is considered to be a problem if:

$$i(x,y) > T_2 \quad (13)$$

where $T_2$ is a predetermined threshold. In the preferred embodiment, the value of $T_2$ is set to a value of 254. Note that the threshold $T_2$ may be dependent upon the color of the photosite at location (x,y). Fast photosites that are problem locations are referred to as saturated pixels, since the value of i(x,y) is as high as possible at these locations.

The (x,y) locations of the problem slow pixels determined by the slow pixel thresholder 46 and the (x,y) locations of the problem fast pixels determined by the fast pixel thresholder 48 are input to the signal extender 50. In addition, the image signal i(x,y) output from the slow pixel equalizer 44 is also input to the signal extender 50. The purpose of the signal extender 50 is to replace the image signal i(x,y) values at problem locations (x,y) with estimates of the signal herein referred to as replacement values, had the inherent dynamic range of each photosite of the image sensing device 10 been greater. If the problem location is coincident with a slow photosite, then the replacement value is calculated from neighboring image signal pixel values coincident with fast photosites. In this embodiment, the term "neighboring" refers to a certain spatial distance. In the preferred embodiment, the photosites neighboring a selected photosite are those photosites within a distance of 2 photosites of the selected photosite. Likewise, if the problem location is coincident with a fast photosite, then the replacement value is calculated from neighboring image signal values coincident with slow photosites. In the preferred embodiment, the color of the photosite at the problem photosite is also taken into account. The replacement value for any problem location is preferably determined only by the signal originating from neighboring photosites of the same color. The output of the signal extender 50 is an image signal i'(x,y) having a dynamic range as if captured by an image sensing device 10 having photosites with inherent dynamic range of $$S = -\log_2\left(\frac{X}{100}\right) \quad (14)$$

rather than the actual inherent dynamic range of S for each photosite of the image sensing device 10. Note that for all (x,y) locations that are not problem locations, the value of i'(x,y) is equivalent to i(x,y).

As an example of the processing performed by the signal extender 50 for the Bayer CFA pattern shown in FIG. 7B, if location (x,y) is a problem location and (x,y) is the location that corresponds to a green photosite (such as photosite 34 in FIG. 7B), then the replacement value i'(x,y) for the image signal i(x,y) is calculated in the following manner:

$$i'(x,y)=0.25*[i(x-1,y-1)+i(x+1,y-1)+i(x-1,y+1)+i(x+1, y+1)] \quad (15)$$

Note that signal values that the calculation of i'(x,y) is dependent upon are expected to comply with certain requirements. For example, suppose that (x,y) is a problem location and (x,y) corresponds to a green photosite with slow response. Then the signal levels of neighboring photosites are used to calculate replacement value i'(x,y). However, this assumes that the signal values of each of the neighboring photosites are also less than $T_3$. In the preferred embodiment, $T_3=T_1$. For each neighboring photosite that this is not the case, that signal level is omitted from the calculation of the replacement value i'(x,y). For example, if $i(x-1, y-1) > T_3$, then the value i'(x,y) is calculated with the following formula:

$$i'(x,y)=\frac{1}{3}*[i(x+1,y-1)+i(x-1,y+1)+i(x+1,y+1)] \quad (16)$$

Generally, the interpolation scheme for determining a replacement value at problem location (x,y), where the location (x,y) corresponds to a green photosite which is also a fast photosite on a image sensing device having a Bayer pattern filter array is given with the following equation:

$$i'(x, y) = \frac{\sum_{j=-1,1} \sum_{k=-1,1} i(x+j, y+k)W(x+j, y+k)}{\sum_{j=-1,1} \sum_{k=-1,1} W(x+j, y+k)} \quad (17)$$

where $$W(x+j, y+k) = \begin{cases} 1 & i(x+j, y+k) > T_3 \\ 0 & \text{otherwise} \end{cases} \quad (18)$$

Note that the same equation is applied to determine the replacement value if the problem location corresponds to a green photosite which is also a slow photosite. However, in this case:

$$W(x+j, y+k) = \begin{cases} 1 & i(x+j, y+k) < T_4 \\ 0 & \text{otherwise} \end{cases}, \quad (19)$$

where in the preferred embodiment, $T_4 = T_2$.

As another example, also in connection with the Bayer CFA pattern shown in FIG. 7B, if location i(x,y) is a problem photosite and (x,y) corresponds to a location of a red or blue photosite, then the replacement value i'(x,y) for the image signal i(x,y) is calculated in the following manner:

$$i'(x,y) = 0.25 * [i(x-2,y) + i(x+2,y) + i(x,y+2) + i(x,y-2)]. \quad (20)$$

When location (x,y) corresponds to a red or blue photosite and is also a fast photosite, the equation for determining the replacement value i'(x,y) may be generalized as follows:

$$i'(x, y) = \frac{\sum_{j=-2,0,2} \sum_{k=-2,0,2} i(x+j, y+k)W(x+j, y+k)}{\sum_{j=-2,0,2} \sum_{k=-2,0,2} W(x+j, y+k)} \quad (21)$$

where $$W(x+j, y+k) = \begin{cases} 1 & i(x+j, y+k) > T_3 \\ 0 & \text{otherwise} \end{cases} \quad (22)$$

Note that in this case, either j or k must be 0, but j and k are never both zero. Note also that the same equation is applied to determine the replacement value if the problem location corresponds to a red or blue photosite which is also a slow photosite. However, in this case $$W(x+j, y+k) = \begin{cases} 1 & i(x+j, y+k) < T_4 \\ 0 & \text{otherwise} \end{cases}, \quad (23)$$

where in the preferred embodiment, $T_4 = T_2$.

The interpolation scheme described above for the purpose of generating an image signal with an extended dynamic range from more than one sparsely sampled image signals may be modified by those skilled in the art. However, many such modifications to the above interpolation scheme may be derived and should not be considered as significant deviations of the present invention.

Those skilled in the art will recognize that the above interpolation scheme performed by the signal extender is a lowpass filter, which is well known in the art. Typically, the application of a lowpass filter to a image signal has a similar effect to reducing the resolution of the image signal. Thus, the processing performed by the DREFA processor 22 is a method by which the spatial resolution of the image sensing device 10 may be traded for dynamic range of the image sensing device 10. Indeed, those areas of an image where the interpolation scheme is implemented to increase the dynamic range of the signal appear noticeably softer (less sharp) than the image would have if that same area of the image had been captured by the sensor in such a fashion that no "problem locations" (as defined by the slow pixel thresholder 46 and the fast pixel thresholder 48) occur.

Referring to FIG. 2, the enhancement processor 240 receives the high resolution digital image and produces an enhanced digital image. Although there are many methods of enhancing digital images that can be used to advantage with the present invention, the preferred embodiment of the present invention produces an enhanced digital image that is directly viewable on a display device. Two transforms are used to prepare the source digital image for direct viewing. The first transform is a 3×3 color matrix transformation which is applied to the color pixels of the source digital image. The color matrix transformation accounts for the difference between the spectral sensitivities of the color photosites of the image sensing device 10 and the spectral characteristics of the display device. The method described above employed by the present invention is similar to the method disclosed in U.S. Pat. No. 5,189,511 issued Feb. 23, 1993 to Parulski et al. entitled Method and Apparatus for Improving the Color Rendition of Hardcopy Images from Electronic Cameras. The second transform involves the application of a tone scale function which maps the extended dynamic range pixel values of the source digital image to pixel values compatible with typical viewing devices. The enhancement processor uses a similar method to the one described in U.S. Pat. No. 5,300,381 issued Apr. 5, 1994 to Buhr et al. entitled Color Image Reproduction of Scenes with Preferential Tone Mapping. Buhr describes a method of calculating a rendering tone scale function with preferential tone mapping in which the contrast of the tone scale function is greatest for midtone pixel intensities and has gracefully lower contrast for shadow and highlight pixel intensities. This rendering tone scale function is combined with a gamma mapping tone scale function to calculate a system tone scale function. The gamma mapping tone scale function compensates for the inherent intensity response of typical viewing devices. The system tone scale function is cascaded with the rendering tone scale function and applied, in the form of a look-up-table) to the pixels of the source digital image resulting in an enhanced digital image.

An important aspect of design for digital camera exposure control sub-systems involves a compromise between noise incurred resulting from an under exposed image and saturation (often referred to as clipping, resulting in a loss of spatial modulation caused by pixel values reaching the limit of the A/D converter 14) resulting from an over exposed image. The slow pixels of the image signal record the imaged light with less photosensitivity than do the fast pixels. Therefore, for any given exposure setting used for the first image capture, the slow pixel values will incur much less clipping than the fast pixel values. It is desirable to use exposure settings that will produce the maximum magnitude of the image signal without causing the slow pixel values to be clipped. Regions of the high resolution digital image for which the corresponding fast pixel values experience clipping will still have good spatial modulation due to the processing performed by the DREFA processor 22 as described above. Therefore, robust exposure control values can be derived from the slow pixel values without considering the fast pixel values.

Another important consideration for any camera that adjusts its exposure settings based on a previously captured image is the time required to analyze the data from the previous capture. The exposure value calculator 250, shown in FIG. 2, performs the analysis in a computationally efficient manner by sampling only the slow pixel values from the image signal generated by the first image captured. The slow pixel values are recorded in a pixel histogram, i.e. the frequency of pixel value occurrences are recorded. For use with an 8-bit A/D converter 14, the pixel values can range from 0 to 255. The pixel histogram would therefore have 256 entries. Once the pixel histogram is populated, each entry of the pixel histogram records the number of pixels in the image signal with the corresponding pixel value. For example, the pixel histogram entry number zero records the number of slow pixels in the image signal that had a value of zero. The pixel histogram is used to calculate a cumulative histogram by integrating the values in the pixel histogram. For the example above, the cumulative histogram entry 67 represents the total number of slow pixels in the image signal that had a value of 67 or less.

While the preferred embodiment of the present invention uses all the slow pixel values (corresponding to red, green and blue photosites) for the pixel histogram, an alternative embodiment of the present invention uses only the green slow pixel values. In this alternative embodiment, the accuracy of the resultant exposure control value is sacrificed somewhat for a computational speed advantage.

In another alternative embodiment of the present invention a slow luminance pixel value is calculated by averaging the pixel values corresponding to the red, green, and blue photosites. In this alternative embodiment, an improved accuracy is obtained (relative to the preferred embodiment) at the sacrifice of computational disadvantage.

The present invention derives the exposure control value from the cumulative histogram. A high pixel value is derived from the cumulative histogram by finding the entry in the cumulative histogram corresponding to a high fraction of slow pixel values. Let the high pixel fraction value be represented by the variable $\tau_p$. Let the total number of slow pixels recorded be represented by the variable $N_p$. Therefore, the number of slow pixels recorded $N_f$ corresponding the high pixel fraction value is given by equation (24).

$$N_f = N_p \tau_p \qquad (24)$$

The present invention will work well with a range of values for the $\tau_p$, however, the preferred embodiment of the present invention uses a value of 0.995. Values much higher than this for $\tau_p$ can be susceptible to small regions of high intensity caused by reflected specular highlights. Values for $\tau_p$ much lower than this can result in overexposed images with clipped slow pixel values. The cumulative histogram is searched for the entry which has a recorded value of less than or equal to $N_f$. The exposure entry index of the cumulative histogram which satisfies this condition is represented by the variable $P_e$.

The exposure entry index $P_e$ is a pixel value which corresponds to a highlight, or high intensity scene object. Therefore, the exposure control value is calculated based on the exposure entry index in a manner that would place the resultant pixel values corresponding to this high intensity scene object near the top of the numerical range. The exposure control value represents a shift in the exposure from the previous exposure. Therefore, exposure entry index $P_e$ must be compared with a reference entry index $R_e$. For the 8-bit A/D converter example given above, a good value for the reference entry index $R_e$ is 247. This value corresponds to approximately 97 percent of the dynamic range of the slow photosites. For 10-bit A/D converter applications the value for $R_e$ would be 992. Thus setting the reference entry index based on the 97 percent criterion, roughly 0.5 percent of the image area would be expected to populate the top 3 percent of possible pixel values.

The ratio of $R_e$ to $P_e$ is used to determine the exposure control value Ecv using equation (25).

$$Ecv = \log_2(R_e/P_e) \qquad (25)$$

The exposure control value Ecv is then used to compute a new brightness value Bv' using equation (26).

$$Bv' = Bv + Ecv = \qquad (26)$$

The new brightness value Bv' is then substituted into equations (6) or (7), depending on the exposure control mode, and a new time value Tv or aperture value Av is calculated respectively. Alternatively, the exposure control value Ecv can be used to calculate a new brightness value Bv' by disregarding the old brightness value using equation (27)

$$Bv' = Bo + Ecv \qquad (27)$$

Where Bo presents a numerical factor corresponding to approximately 18 percent of the numerical range of the possible pixel values which is determined using equation (28).

$$Bo = Av + Tv - Sv \qquad (28)$$

Referring to FIG. 2, an alternative embodiment of the present invention pre-processes the slow pixel values output from the A/D converter 14 to form a paxelized digital image, i.e. a low resolution digital image. This paxelized digital image is then received by the exposure value calculator 250 where it is processed in similar manner to the slow pixel values. The exposure value calculator 250 calculates an exposure control value from the pixels of the paxelized digital image.

Figure 9:
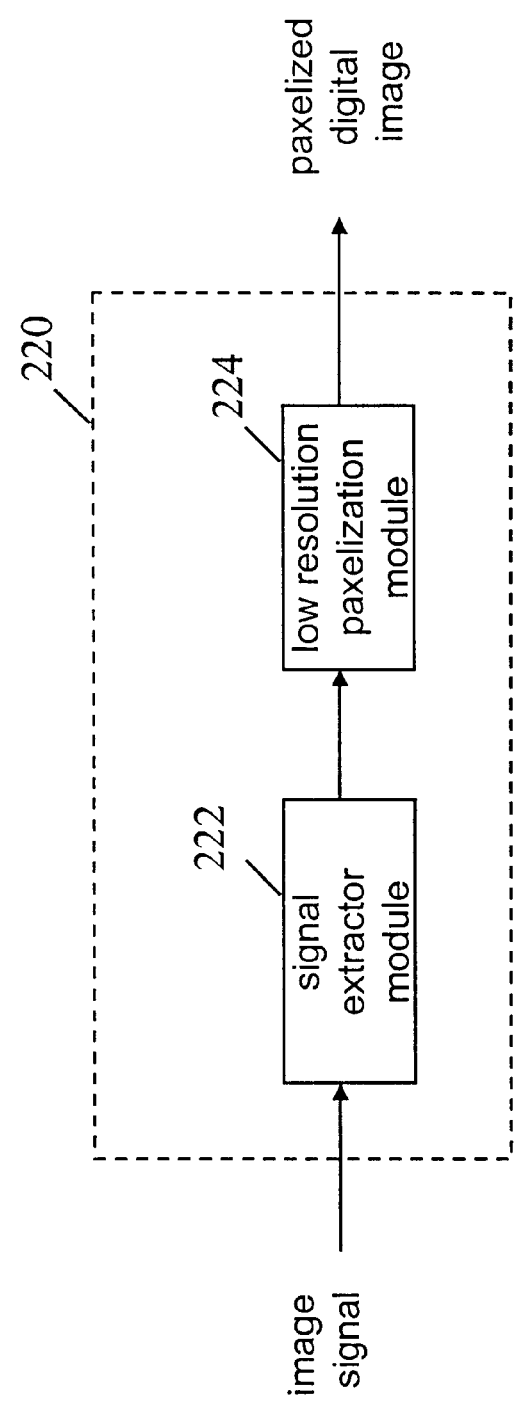
FIG. 9 is a functional block diagram of the CFA paxelization module.

The CFA paxelization module 220 shown in FIG. 2 is illustrated in more detail in FIG. 9. The CFA paxelization module 220 receives an image signal as unaltered from the A/D converter 14. The image signal is received by the signal extractor module 222 which assembles the slow pixel values of the image signal corresponding to the slow photosites to form a sparsely sampled slow digital image. The low resolution paxelization module 224 receives the sparsely sampled slow digital image and performs a numerical averaging spatial filtering technique which results in a paxelized digital image.

An example of a sparsely sampled slow digital image derived from the image signal produced with the CFA photosite pattern as illustrated in FIGS. 7A and 7B are shown in FIGS. 10A, 10B, and 10C. FIG. 10 A illustrates that all of the pixel locations of the green digital image channel are populated with values from the green pixels of the image signal. However, FIGS. 10B and 10C illustrate that every other column and every other row of the red and blue digital image channels have are unpopulated. It is important to note that the sparsely sampled slow digital image has half the number of rows and half the number of columns as the sparsely sampled high resolution digital image from which they are derived. It is also important to note that action taken by the signal extractor module 222 does not have to rearrange the storage of the pixel data in computer memory. The present invention implements the signal extractor module 222 as a pointer addressing scheme to the storage of the pixel data in computer memory. Thus the most important aspect of the signal extractor module 222 is the capability of indexing pixel data corresponding to the slow photosites.

As described above, the low resolution paxelization module 224 shown in FIG. 9 receives the sparsely sampled slow digital image. A block averaging technique (a form of spatial filtering), is used to calculate a paxelized value for each block of pixel values in the sparsely sampled slow digital image. The present invention uses an integer number of pixels in the block size to average. This results in a paxelized digital image which has dimensions which are related to the dimensions of the high resolution digital image by a multiplicative integer value. For example, if the high resolution digital image described above has 1536 by 2304 pixels, the sparsely sampled slow digital image would have 768 by 1152 pixels. Therefore with the block averaging technique, the resultant sizes of the paxelized digital images would be 384 by 576, 192 by 288, etc. (Arbitrary size paxelized digital images can be produced by using a bi-linear interpolation method for example).

Figure 11:
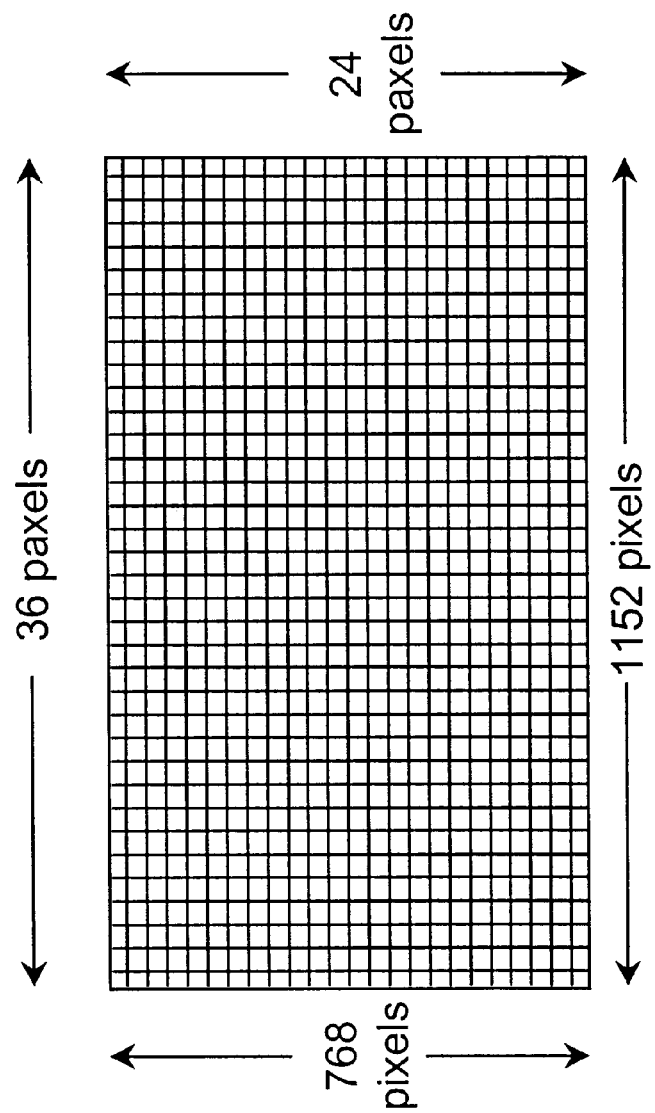
FIG. 11 shows an example of the arrangement of pixels for block averaging.

Referring to FIG. 10A, the green pixel locations of the sparsely sampled slow digital image are fully populated with pixel values. For a 2 by 2 block size, the pixel values in rows referenced by indices 0 to 1 and columns referenced by indices 0 to 1 will be averaged to produce a paxel value which will be the first green pixel value of the paxelized digital image. Referring to FIG. 10B, the red pixel locations of the sparsely sampled slow digital image not fully populated with pixel values. Thus for a 2 by 2 block size, the pixel values $r_{01}$ and $r_{10}$ will be averaged to produce a paxel value which will be the first red pixel value of the paxelized digital image. The blue paxel values are calculated in similar manner. FIG. 11 represents a pictoral diagram of the block regions for a block size of 32 by 32 pixels which results in a paxelized digital image of size 24 by 36 paxels.

The invention has been described in detail with particular reference to certain preferred embodiments thereof, but it will be understood that variations and modifications can be effected within the spirit and scope of the invention.

Parts List 2 lens
3 aperture device
4 time integration device
6 optical lowpass filter
10 image sensing device
14 A/D converter
16 exposure control device
22 DREFA processor
26 CFA interpolator
28 slow photosite
30 fast photosite
32 red slow photosite
34 green slow photosite
36 blue slow photosite
38 red fast photosite
40 green fast photosite
42 blue fast photosite
44 slow pixel equalizer
46 slow pixel thresholder
48 fast pixel thresholder
50 signal extender
51 lenslet
52 slow photosite location
53 color filter array
53a red filter
53b green filter
53c blue filter
53d green filter
54 light blocking mask portion
55 photosensitive area
56 large aperture
57 small aperture
58 layer of neutral filters
59 neutral filter
200 digital image processor
220 CFA paxelization module
222 signal extractor module
224 low resolution paxelization module
240 enhancement processor
250 exposure value calculator

What is claimed is:

1. A method of exposure control in a camera employing a sparsely sampled extended dynamic range image sensing device comprising the steps of:

a) providing a sparsely sampled extended dynamic range image sensing device having fast photosites with a predetermined response to light exposure interspersed with slow photosites with a slower response to the same light exposure;

b) using the image sensor to produce a sparsely sampled high resolution digital image having fast pixel values produced by the fast photosites and slow pixel values produced by the slow photosites;

c) calculating an exposure control value using only the slow pixel values from the a sparsely sampled extended dynamic range image; and d) using the exposure control value to modify the exposure to the image sensing device.

2. The method claimed in claim 1, wherein the step of calculating includes the steps of:

c1) generating a cumulative histogram of the slow pixel values; and c2) determining the exposure control value from a predetermined cumulative histogram value.

3. The method claimed in claim 2 further including the step of:

generating a low resolution digital image from the slow pixel values; and wherein the cumulative histogram is generated from the pixel values of the low resolution digital image.

4. The method claimed in claim 3, wherein the low resolution digital image is generated from a subset of the slow pixel values.

5. The method claimed in claim 3, wherein the low resolution digital image is generated by low pass filtering the slow pixel values.

6. The method claimed in claim 1 wherein the image sensing device is a color image sensor having red green and blue fast and slow photosites, and only the slow pixel values from the green photosites are used to calculate the exposure control value.

7. The method claimed in claim 1 wherein the image sensing device is a color image sensor having three colors of fast and slow photosites, and including the step of calculating luminance pixel values from the color slow pixel values and wherein the luminance pixel values are used to calculate the exposure control value.

8. The method claimed in claim 1, wherein the camera includes an aperture device and the exposure control value is used to control the aperture device.

9. The method claimed in claim 1, wherein the camera includes a shutter and the exposure control value is used to control the shutter.

10. The method claimed in claim 1, wherein the exposure control value is used to control the integration time of the image sensing device.

11. Apparatus for exposure control in a camera having an image sensing device and an exposure control mechanism, comprising:

a) the image sensing device being a sparsely sampled extended dynamic range image sensing device having fast photosites with a predetermined response to light exposure interspersed with slow photosites with a slower response to the same light exposure for producing a sparsely sampled high resolution digital image having fast pixel values produced by the fast photosites and slow pixel values produced by the slow photosites;

b) means for calculating an exposure control value using only the slow pixel values from the a sparsely sampled extended dynamic range image; and c) means for using the exposure control value to control the exposure control mechanism.

12. The apparatus claimed in claim 11, wherein the means for calculating includes:

b1) means for generating a cumulative histogram of the slow pixel values; and b2) means for determining the exposure control value from a predetermined cumulative histogram value.

13. The apparatus claimed in claim 12 further including:

means for generating a low resolution digital image from the slow pixel values; and wherein the means for generating the cumulative histogram generates the cumulative histogram from the pixel values of the low resolution digital image.

14. The apparatus claimed in claim 13, wherein the low resolution digital image is generated from a subset of the slow pixel values.

15. The apparatus claimed in claim 13, wherein the means for generating the low resolution digital image includes means for low pass filtering the slow pixel values.

16. The apparatus claimed in claim 11 wherein the image sensing device is a color image sensor having red green and blue fast and slow photosites, and the means for calculating the exposure control value uses only the slow pixel values from the green photosites to calculate the exposure control value.

17. The apparatus claimed in claim 11 wherein the image sensing device is a color image sensor having three colors of fast and slow photosites, and including means for calculating luminance pixel values from the color slow pixel values and wherein the means for calculating the exposure control value uses the luminance pixel values to calculate the exposure control value.

18. The apparatus claimed in claim 11, wherein the exposure control mechanism is an aperture device and the exposure control value is used to control the aperture device.

19. The apparatus claimed in claim 11, wherein the exposure control mechanism is a shutter and the exposure control value is used to control the shutter.

20. The apparatus claimed in claim 11, wherein the exposure control value is used to control the integration time of the image sensing device.

* * * * *